INVENTORS
ANDREAN G. RONNING
ADOLPH RONNING

Patented July 21, 1931

1,815,274

UNITED STATES PATENT OFFICE

ADOLPH RONNING, OF MINNEAPOLIS, MINNESOTA, AND ANDREAN G. RONNING, DECEASED, LATE OF MINNEAPOLIS, MINNESOTA, BY ADOLPH RONNING AND JACOB A. RONNING, BOTH OF MINNEAPOLIS, MINNESOTA, EXECUTORS

COMBINATION TRACTOR HARVESTER

Original application filed August 13, 1923, Serial No. 657,176. Divided and this application filed December 19, 1928. Serial No. 327,138.

This invention relates to combination tractor harvester machines, and the main object is to provide means of a novel, efficient and practical nature for connecting up a harvester with a tractor whereby they may be propelled over the field as a single machine under the observation and control of a single operator who is stationed on the tractor. A further object is to so position the harvester, with respect to the tractor, that it will quickly and properly respond to the steering of the latter, and so that the tractor may travel in the stubble, with a novel arrangement of conveyor which will permit the harvested crop to be delivered into a truck or wagon which may also travel in the stubble, at the opposite side of the tractor from the harvester. A further object is to provide a novel form of power transmission whereby the harvester may be conveniently driven by a power take-off mechanism from the tractor engine, which power take-off mechanism will permit of the necessary adjustments of the harvester with respect to the tractor. With these and other more specific objects in view, which will be more fully explained in the following specification, the invention resides in the novel construction, combination and arrangement of parts hereinafter set forth and more particularly defined by the appended claims, it being understood that various changes may be made in the specific embodiment illustrated as may come within the scope of the claims.

This application is a division of application for Patent Ser. No. 657,176, filed August 13, 1923, for ensilage harvester, which application matured into Patent No. 1,699,251, issued January 15, 1929.

In the accompanying drawings, which illustrate a preferred form of the present invention;

Figure 1:
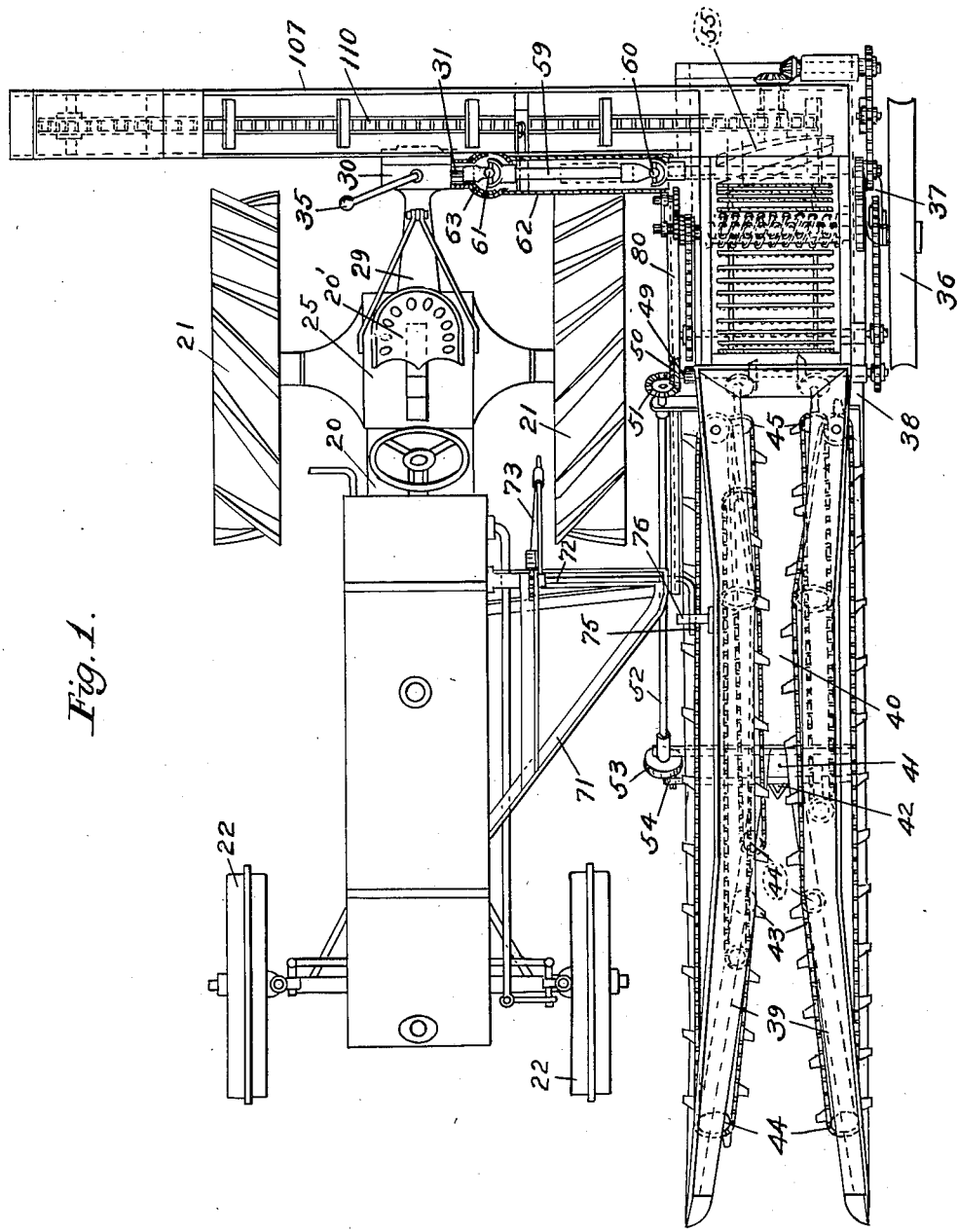
Fig. 1 is a plan view of the machine.

Of the parts of the tractor illustrated, it is desirable for the purposes of this case only to particularly note the tractor main frame 20, the rear traction wheels 21, the front steering wheels 22, and the worm gear shaft 23, which latter is the customary element of a common type of tractor arranged to co-operate with a worm gear and differential gear mechanism to transmit power from the tractor engine to the traction wheels. The rear end of the shaft 23, as is customary, is journaled in an anti-friction bearing 24 on the rear portion of a differential transmission housing 25. The shaft 23 is utilized as a convenient and desirable element for initial transmission of power from the tractor engine to the ensilage harvester proper, and hence a rearwardly extended shaft 26 is provided at its front end with a clutch member 27 that is detachably engageable with a clutch member 28, which latter is in the nature of an annular hub rigidly secured on the threaded rear end of said shaft 23. This shaft 26 is journaled in a tubular arm 29, the front end of which is rigidly but detachably secured to the housing 25. This arm 29 acts as a rigid cantilever extension of the tractor main frame, and at its rear end it is provided with a tubular transverse gear casing 30 in which is journaled a short transverse driving shaft 31. The rear end of the shaft 26 carries a bevel gear 32 that works within gear casing 30 and meshes with a bevel pinion 33 that is loose on the shaft 31 but adapted to be coupled thereto, at will, by a clutch collar 34 out to slide on said shaft. The clutch collar 34, as shown, is adapted to be shifted by a lever 35 mounted in the casing 30 and adapted to be readily reached by the operator from the driver's seat 20'.

The ensilage harvester proper is preferably made in the form of an attachment which is carried in part by the tractor frame and in part by an auxiliary wheel 36. This wheel 36 is journaled on the crank-like end of an adjustable crank axle 37 which, in turn, is journaled to and supports a framework 38 of the ensilage harvester or attachment. This framework 38 is of skeleton form and is arranged to support a pair of laterally spaced forwardly projecting gathering frames 39. The rear lower portions of the gathering frames 39 are connected by an inclined deck 40, at the front edge of which a reciprocating cutter bar 41 is mounted. This cutter bar 41 is shown as provided with a sickle plate 42 that serves to cut the standing corn stalks from the ground. The cutter bar 41 is reciprocated by a pitman 54 connected to a disk 53 of a shaft 52 driven from the harvester mechanism in a manner more specifically set forth in application, Ser. No. 657,176. In said application is also described more in detail how the corn stalks, after being severed from the roots, are carried rearward and upward on the inclined deck 40 by means of toothed feed devices in the form of sprocket chains 43 arranged to run obliquely over idle sprockets 44 and over driving sprockets 45 suitably mounted on the gathering frames 39. The sprockets 45 are arranged to be driven by upright shafts which, at their lower ends, are provided with bevel gears that mesh with bevel gears on a transverse shaft 49 journaled in the framework 38 below the rear end of the deck 40.

The transverse shaft 49, at its inner end, is provided with a bevel gear 50 that meshes with a bevel gear 51 on the rear end of the shaft 52 that is journaled in suitable bearings on the tractor side of the gathering frames 39.

The ensilage cutter preferably herein employed is of the lawn mower type; that is, of a type comprising spiral cutting blades 55 which, by radial arms are connected to a cutter shaft 56 journaled in suitable bearings on the housed end or box-like rear portion 57 of the harvester frame. This ensilage cutter is arranged on a transverse axis to rotate just rearward of and below the rear end of the inclined deck 40, and it co-operates with a relatively fixed shearing plate 58 suitably secured in the housing 57.

Figure 2:
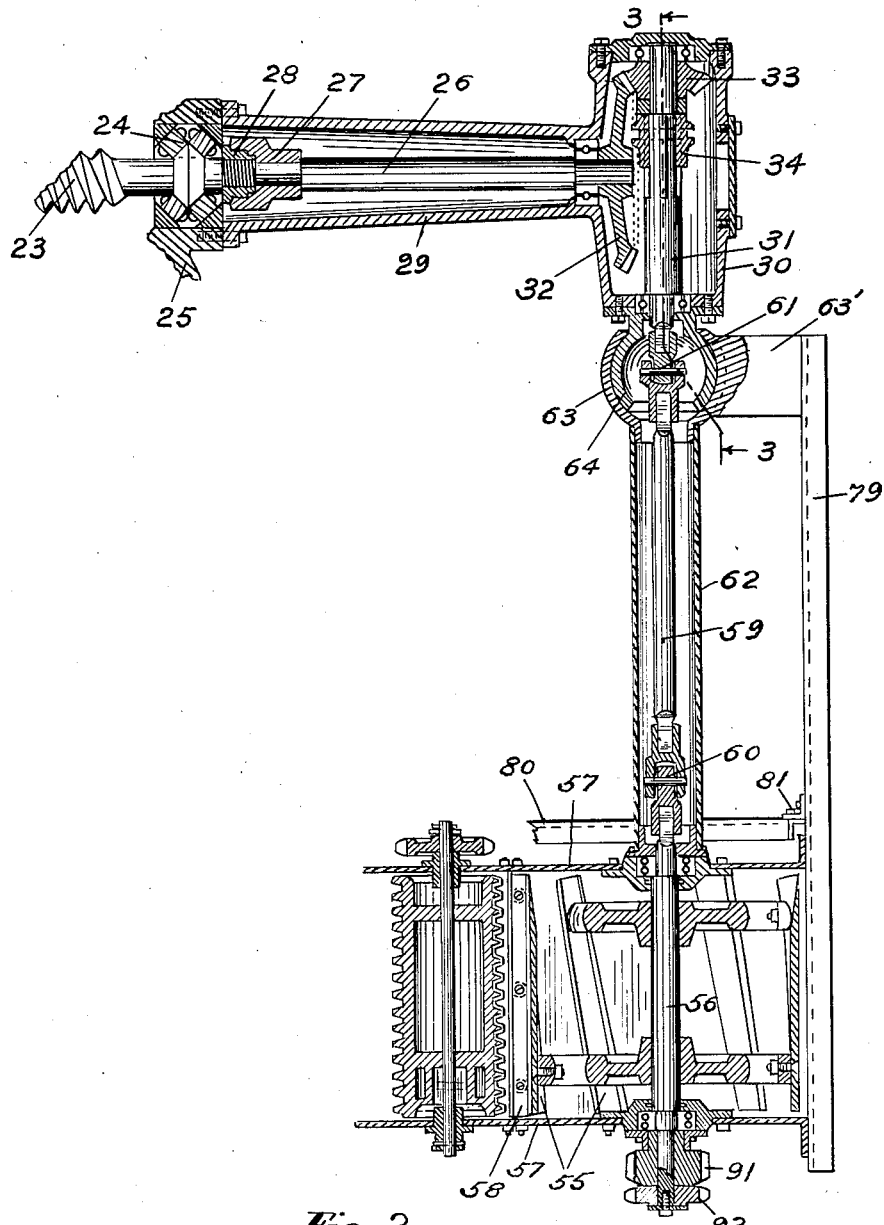
Fig. 2 is an enlarged detail sectional view of the improved power take-off mechanism, and also shows adjacent parts of the tractor and harvester, in section.
Figure 3:
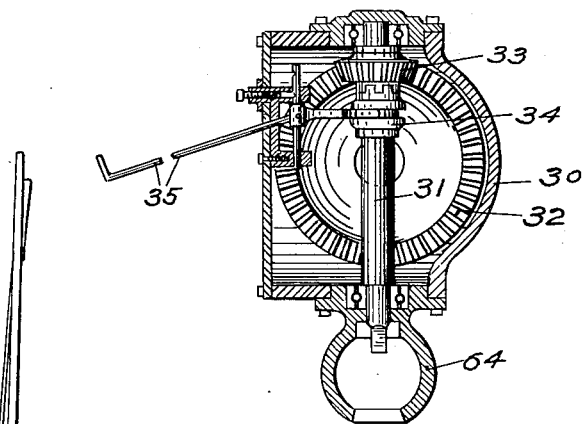
Fig. 3 is a sectional view as seen substantially on the line 3—3 in Fig. 2.

By reference to Figs. 1 and 2 it will be noted that the cutter shaft 56 is driven from the shaft 31 through an intermediate shaft 59 connected, respectively, to the shafts 56 and 31, by knuckle joints 60 and 61. The shaft 59 works in a relatively large tubular housing 62 which, at one end, is rigidly secured to the housing 57, and at its other end is provided with a two-part substantially spherical casing 63 that loosely engages over a head 64 rigidly secured to the adjacent end of the gear casing 30. In this way, the rear portion of the ensilage harvester is flexibly connected to the tractor frame with freedom for angular and vertical movements but is held substantially spaced from the tractor. As the crop is cut into ensilage by the cutter 55 such ensilage is delivered downwardly and rearwardly into a boot or receiving end of a carrier 107 in which operates an endless conveyor 110, adapted to convey the cut ensilage from the harvester to a truck or wagon travelling along with the tractor at the opposite side therefrom from the harvester unit proper. The conveyor 110, as well as the gathering chains 43 and the feeding devices of the harvester are all driven by pinions 91 and 92 on the cutter shaft 56, but as these mechanisms are all set forth at length in the parent application they will not be further detailed in the present instance.

Figure 4:
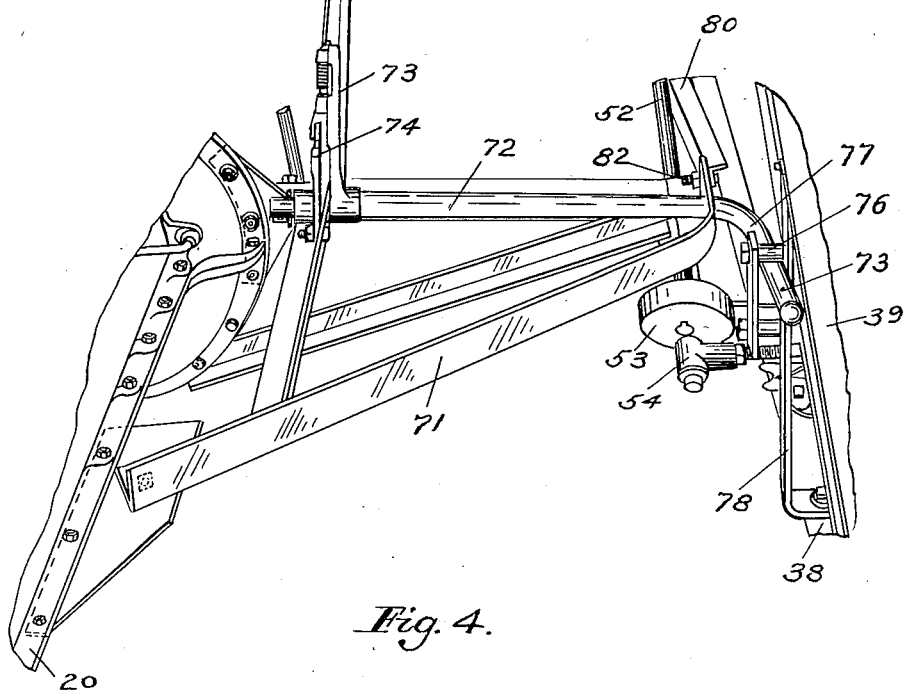
Fig. 4 is a perspective detail view of the supporting frame and adjusting mechanism between the tractor and harvester units.

As already noted, the coupling devices above described and particularly shown in Fig. 2 afford one of the connections between the tractor and the ensilage harvester proper, but other connections are provided for causing the ensilage harvester to travel with the tractor while permitting the required relative movements and adjustments thereof. One of the most important connections is best shown in detail in Fig. 4, and is also shown in Fig. 1. The numeral 71 indicates a trussed bracket that is rigidly secured to the tractor frame 20 and projects toward the left therefrom terminating close to the inner side of the inner gathering frames 39. Mounted for oscillatory movements in this bracket 71 is a rock shaft 72 equipped with a latch lever 73 that co-operates with a latch segment 74 rigidly secured on the bracket 71. At its outer end, the rock shaft 72 has a radially projecting lifting arm 75 that works between vertically spaced studs 76 on the adjacent side of the gathering frame 39. The studs 76 are tied together by a retaining plate 77 and the lifting arm 75 works just inward of this plate 77 and just outward of the guide strip 78 that is rigidly secured to the inner gathering frame 39. Normally, the upper stud 76 will rest on the lifting arm 75. Said arm carries part of the weight of the ensilage harvester and the harvester may be vertically adjusted by oscillatory movements of the rock shaft 72 by the lever 73. Also the arm 75 being engaged between the plates 77 and 78 serves to hold the ensilage harvester laterally spaced from the tractor. Under vertical movements imparted to the harvester by raising and lowering movements of the lifting arm 75, the gathering frames are oscillated vertically on the ground wheels 36 and on the ball and socket connection 63—64 between the gear case 30 and the tubular housing 62.

The ensilage harvester is held laterally spaced from the tractor by connections described and by a transverse beam 79, (see Fig. 2), one end of which is rigidly secured to the housing 57 and the other end of which is rigidly secured to a projection 63′ of the outer spherical casing 63. The force required to cause the ensilage harvester to travel with the tractor is taken chiefly by a drawbar 80, which, at its rear end, (see Fig. 2) is pivotally connected at 81 to the tie-bar 79, and at its front end, (see Fig. 4), is pivotally connected at 82 to the offset bracket 71 of the tractor.

As the front or receiving ends of the gathering frames are carried to the left of and quite close to the steering wheels 22 it will be seen that they will respond quickly to the steering of the tractor, and consequently the operator, who is in a position to observe the location of the frames with respect to the crop row being cut, can easily steer the machine so that the harvester will best receive the standing crop. It will also be seen that the operator may conveniently regulate the cutting height of the primary cutter 41—42 by manipulating the adjusting lever 73, which action raises and lowers the front end of the harvester which tilts from its rear, and that the construction disclosed also permits of a full floating action of the rear end of the harvester with respect to the tractor, from the center 61, so that the harvester supporting wheel 36 may freely accommodate itself to uneven ground conditions and to surface irregularities that may be different from those travelled over by the traction wheels 21, and, further, that the power transmission to the harvester mechanisms will continue to function smoothly and efficiently regardless of the varying relative operating positions of the harvester and tractor.

While in the foregoing there has been illustrated and described the combination and arrangement of mechanisms that constitute the preferred embodiment of the invention, it is understood that the invention is to be construed and interpreted in the light of the spirit and scope of the following claims. The invention thus being shown and described, what is claimed is:

1. In combination with a tractor, an implement frame disposed at the side of the tractor, a ground wheel at the rear of the frame, means including a power transmission device for pivotally connecting the rear end of the frame and supporting it with respect to the tractor so that the rear end of the frame is free to move, with its ground wheel, from the pivot connection, and means extending from the tractor to support the forward end of the frame.

2. In combination with a tractor, an implement frame disposed at the side of the tractor, a ground wheel at the rear of the frame, means including a power transmission device for pivotally connecting the rear end of the frame and supporting it with respect to the tractor so that the rear end of the frame is free to move, with its ground wheel, from the pivot connection, and means extending from the tractor to support the forward end of the frame, said support means comprising a frame extending laterally from the tractor to support the implement frame and a draw bar connecting the laterally extending frame to the rear end of the implement frame.

Signed at Minneapolis, Minnesota, this 17th day of December, 1928.
ADOLPH RONNING,
Joint Inventor.
ADOLPH RONNING,
JACOB A. RONNING,
Joint Executors of the Estate of Andrean G. Ronning, Deceased.